United States Patent
Kaneko et al.

(10) Patent No.: US 9,322,372 B2
(45) Date of Patent: Apr. 26, 2016

(54) FUEL INJECTION VALVE

(71) Applicants: KEIHIN CORPORATION, Tokyo (JP); HONDA MOTOR CO., LTD., Tokyo (JP)

(72) Inventors: Yoshihiro Kaneko, Utsunomiya (JP); Gaku Sato, Utsunomiya (JP); Junichi Fukuda, Utsunomiya (JP); Mitsuhiro Iwadare, Utsunomiya (JP); Tetsuji Furukawa, Utsunomiya (JP); Takeshi Kumakura, Utsunomiya (JP); Minoru Torii, Utsunomiya (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/255,328

(22) Filed: Apr. 17, 2014

(65) Prior Publication Data

US 2014/0316646 A1 Oct. 23, 2014

(30) Foreign Application Priority Data

Apr. 22, 2013 (JP) .................................. 2013-089632

(51) Int. Cl.
| | |
|---|---|
| *F02M 57/00* | (2006.01) |
| *F02M 57/06* | (2006.01) |
| *F02D 41/30* | (2006.01) |
| *G01M 15/08* | (2006.01) |

(52) U.S. Cl.
CPC ............. *F02M 57/005* (2013.01); *F02D 41/30* (2013.01); *F02M 57/06* (2013.01); *G01M 15/08* (2013.01)

(58) Field of Classification Search
CPC ...... F02M 57/005; F02M 57/06; F02D 41/30; G01M 15/08
USPC ................................. 701/34.4, 103
See application file for complete search history.

(56) References Cited

U.S. PATENT DOCUMENTS

| | | | | |
|---|---|---|---|---|
| 5,024,082 A | * | 6/1991 | Ohkubo et al. ............ | 73/114.16 |
| 5,353,764 A | * | 10/1994 | Tomisawa ...................... | 123/435 |
| 5,693,936 A | * | 12/1997 | Komachiya et al. ..... | 250/227.17 |
| 8,100,344 B2 | | 1/2012 | Kondo et al. | |
| 2009/0159042 A1 | * | 6/2009 | Nakagawa et al. ........... | 123/334 |
| 2010/0312456 A1 | * | 12/2010 | Nishimura et al. ........... | 701/103 |

FOREIGN PATENT DOCUMENTS

| | | |
|---|---|---|
| CN | 101691851 | 4/2010 |
| JP | 2001-020779 | 1/2001 |

OTHER PUBLICATIONS

Chinese Office Action dated Dec. 28, 2015 with partial English Translation, 7 pages.

* cited by examiner

*Primary Examiner* — Mussa A Shaawat
*Assistant Examiner* — Yazan A Soofi
(74) *Attorney, Agent, or Firm* — Rankin, Hill & Clark LLP

(57) ABSTRACT

A fuel injection valve includes a cylinder internal pressure sensor disposed in the vicinity of a distal end thereof. The cylinder internal pressure sensor detects a cylinder internal pressure in a cylinder and outputs a first sensor signal Ss1 responsive to the detected cylinder internal pressure. Further, a signal processor, which carries out predetermined signal processing with respect to the first sensor signal Ss1 to thereby convert the first sensor signal Ss1 into a second sensor signal Ss2, is disposed between the cylinder internal pressure sensor and a solenoid unit, which is disposed on a proximal end side of the fuel injection valve.

4 Claims, 4 Drawing Sheets

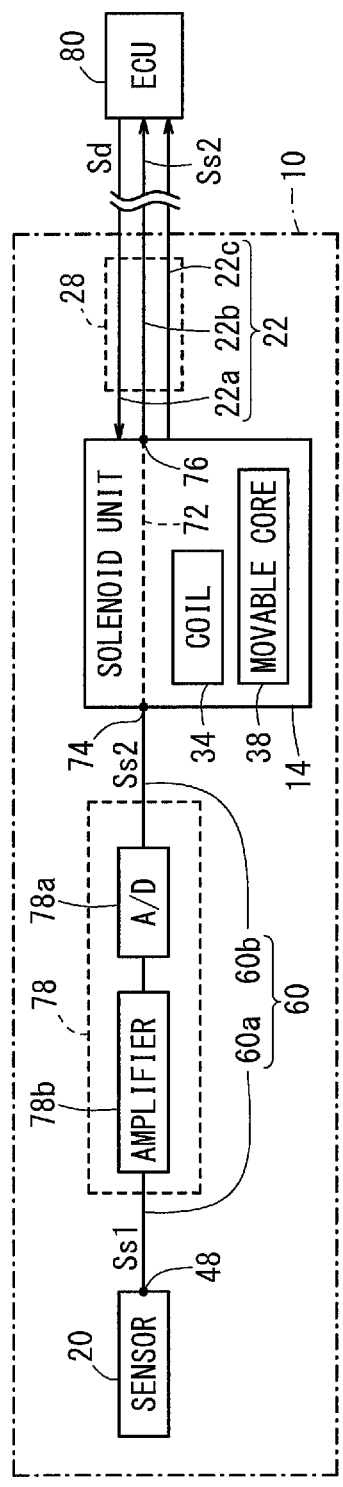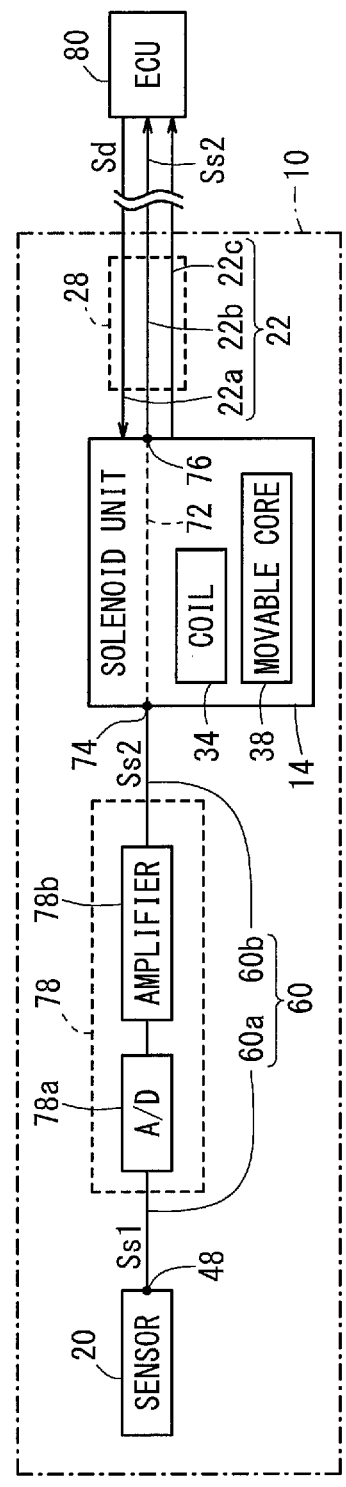

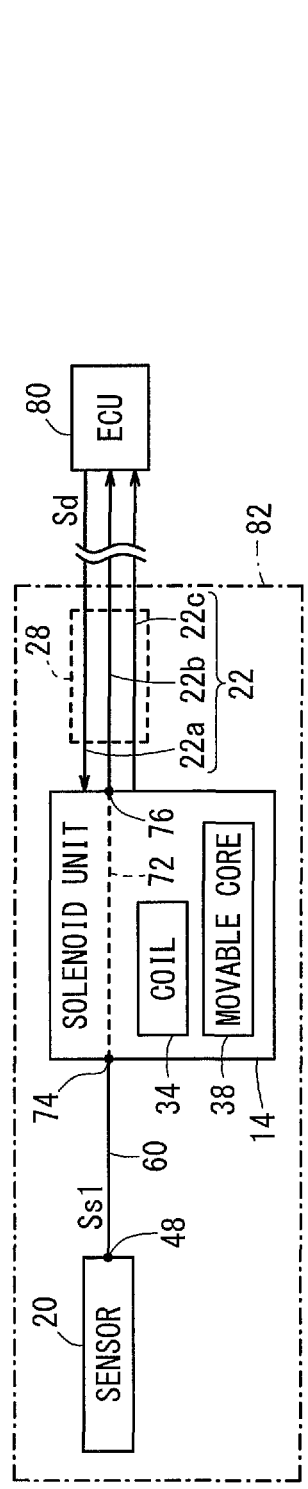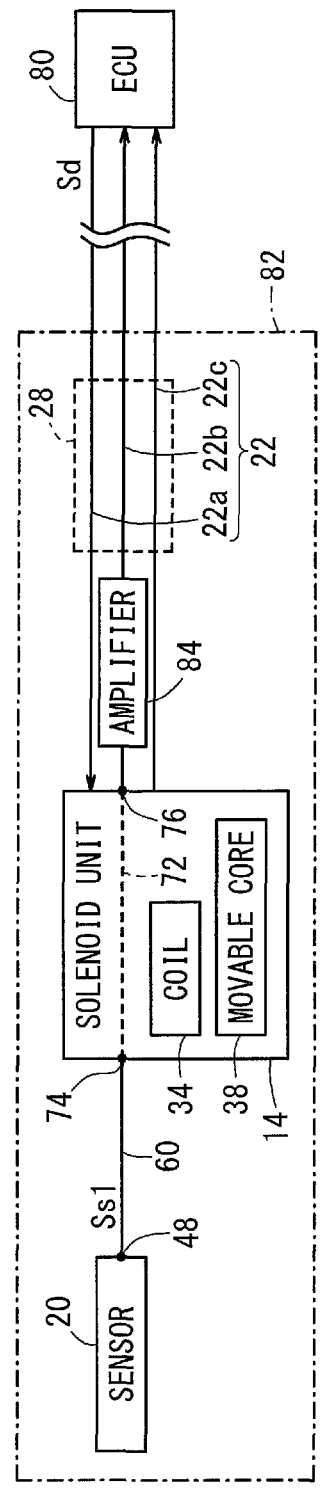
FIG. 4A
FIG. 4B

FUEL INJECTION VALVE

CROSS-REFERENCE TO RELATED APPLICATION

This application is based upon and claims the benefit of priority from Japanese Patent Application No. 2013-089632 filed on Apr. 22, 2013, the contents of which are incorporated herein by reference.

BACKGROUND OF THE INVENTION

1. Field of the Invention

The present invention relates to a fuel injection valve which, in a valve open condition caused by driving of an actuator, directly injects fuel into a combustion chamber in a cylinder of an internal combustion engine.

2. Description of the Related Art

Heretofore, in a direct fuel injection type of internal combustion engine, there have been provided a fuel injection valve for directly injecting fuel into a combustion chamber in a cylinder, and a cylinder internal pressure detecting unit, which detects a cylinder internal pressure in the cylinder, and produces an output signal responsive to the detected cylinder internal pressure (see, Japanese Laid-Open Patent Publication No. 2001-020779).

SUMMARY OF THE INVENTION

In the aforementioned publication, the cylinder internal pressure detecting unit is disposed on a side portion of a spark plug.

With respect thereto, since the valve opening time is controlled based on the output signal from the cylinder internal pressure detecting unit, in the event that the cylinder internal pressure detecting unit is disposed on the fuel injection valve, it is desirable for the cylinder internal pressure detecting unit to be disposed in the vicinity of a distal end of the fuel injection valve that confronts the combustion chamber.

Incidentally, in a direct fuel injection type of internal combustion engine, fuel can be injected directly into the combustion chamber by the fuel injection valve being placed in a valve open state by driving of an actuator. The actuator is disposed on a proximal end side of the fuel injection valve, and on the proximal end side, a coupler is disposed, which is connected to a connector of a harness that extends from an ECU (Engine Control Unit). Consequently, the ECU supplies a drive signal for opening the fuel injection valve to the actuator via the harness, the connector, and the coupler. On the other hand, the cylinder internal pressure detecting unit outputs the output signal to the ECU via the coupler, the connector, and the harness, by way of wiring on a side portion of the actuator.

In this case, the output signal is a weak signal having a signal level lower than that of the drive signal. Further, with the actuator, by supply of the drive signal, a coil is excited by causing a current to flow through the coil, and under an excitation action of the coil, by movement of a movable core connected to the valve element, the valve element separates away from a fuel injector opening, thereby causing the fuel injection valve to shift from a valve closed state into a valve open state. Consequently, in the case that the cylinder internal pressure detecting unit outputs an output signal to the ECU via wiring in the vicinity of the actuator, noise caused by the drive signal, and noise caused by excitation of the coil become superimposed on the output signal that passes through the wiring.

In this manner, if the output signal, which is influenced by noise, is input to the ECU, the ECU generates the drive signal based on the output signal with noise superimposed thereon, and since the drive signal is supplied to the fuel injection valve, the fuel injection valve cannot be controlled accurately and with high precision.

Thus, with the ECU, there is a need to remove noise using a filter, or alternatively, to remove such noise by way of signal processing. However, in the case that a filter is added, the number of parts increases on the side of the ECU. On the other hand, if the noise is removed by way of signal processing, the ECU must be constituted as a complex and high-performance signal processing apparatus. Accordingly, in the event that either of such noise removal countermeasures is adopted, costs are increased.

The present invention has been devised taking into consideration the various problems mentioned above, and has the object of providing a low cost fuel injection valve, which is cable of controlling the influence of noise with respect to an output signal output from a cylinder internal pressure detecting unit.

To accomplish the aforementioned object, the present invention includes a cylinder internal pressure detecting unit disposed in the vicinity of a distal end of a fuel injection valve, for detecting a cylinder internal pressure in the cylinder, and outputting an output signal responsive to the detected cylinder internal pressure, and a signal processing unit for performing predetermined signal processing with respect to the output signal, the signal processing unit being disposed between the cylinder internal pressure detecting unit and the actuator, which is disposed on a proximal end side of the fuel injection valve.

In accordance with this configuration, by disposing the signal processing unit between the cylinder internal pressure detecting unit and the actuator, signal processing is performed with respect to the output signal before the output signal passes through the wiring disposed in the vicinity of the actuator. Owing thereto, the output signal is converted into a signal having high resistance to noise, whereby at a low cost, the influence of noise with respect to the output signal can be suppressed. As a result, the ECU acquires an output signal in which the influence of noise thereon is small, and based on the acquired output signal, the ECU can control the fuel injection valve accurately and with high precision. In this manner, with the present invention, by providing the signal processing unit, the output signal can be detected with high accuracy.

In the fuel injection valve, the signal processing unit preferably comprises an A/D converter for converting the output signal into a digital signal. The output signal is digitalized (converted into a digital signal) by the A/D converter, and since the output signal can be converted into a signal having high resistance to noise, the influence of such noise can be made smaller. Further, the noise removal process on the side of the ECU can be carried out easily.

Further, the signal processing unit may comprise an amplifier for amplifying the output signal. If, as a result of amplifying the output signal by the amplifier, the signal level of the output signal after amplification thereof is made relatively higher than the noise level, the output signal is converted into a signal having high resistance to noise. Thus, in this case as well, the influence of such noise can be made smaller.

Furthermore, in the case that the signal processing unit comprises both an A/D converter and an amplifier, the amplifier and the A/D converter may be connected in this order electrically to the cylinder internal pressure detecting unit, or alternatively, the A/D converter and the amplifier may be connected in this order electrically to the cylinder internal pressure detecting unit. In this manner, by connecting the A/D converter and the amplifier electrically in series, the influence of noise can further be minimized.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 3A and 3B are block diagrams of the fuel injection valve of FIG. 1; and

FIGS. 4A and 4B are block diagrams of fuel injection valves according to comparative examples.

DESCRIPTION OF THE PREFERRED EMBODIMENTS

A preferred embodiment of a fuel injection valve according to the present invention will be described in detail below with reference to the accompanying drawings.

Basic Structure of the Present Embodiment

Figure 1:
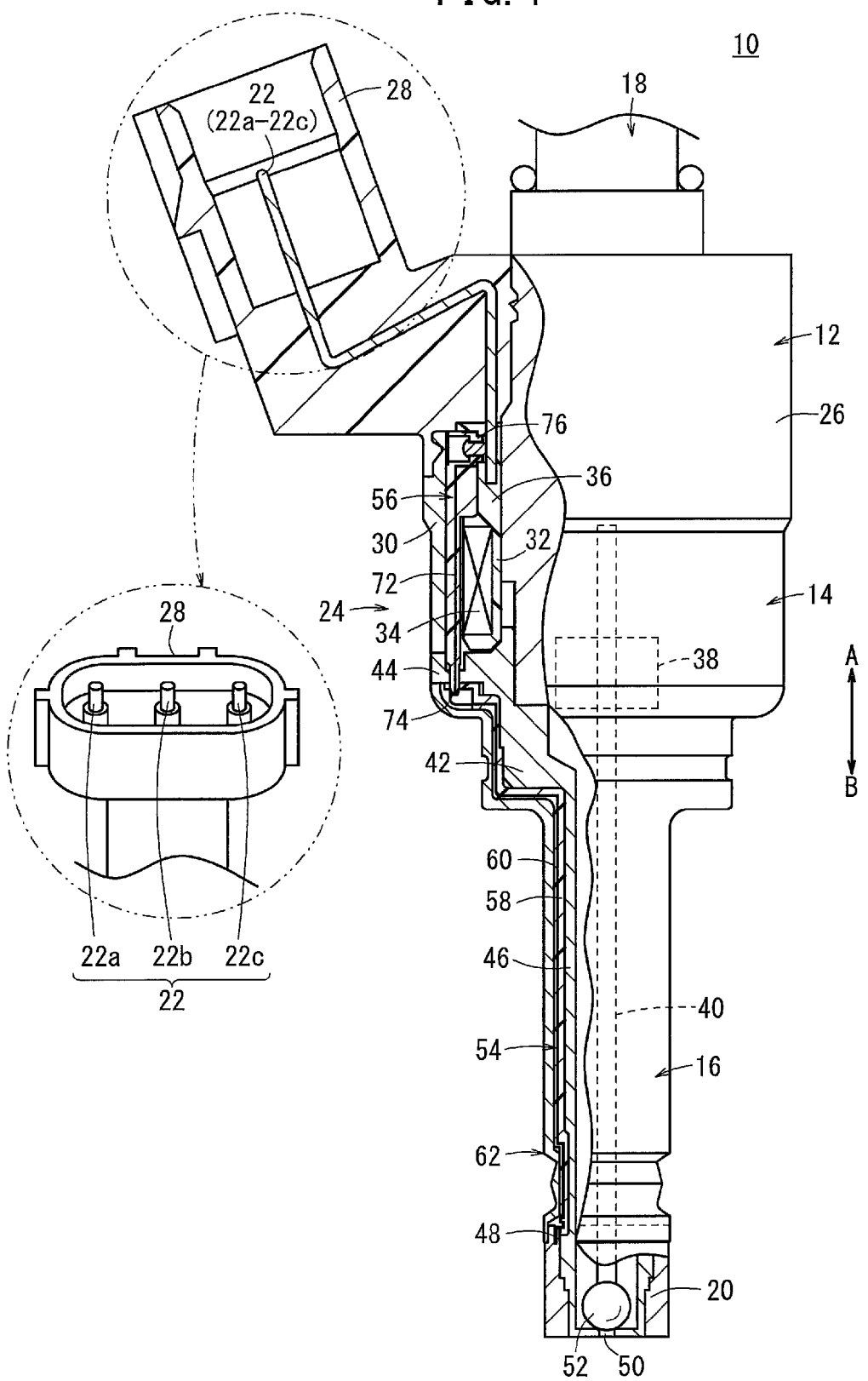
FIG. 1 is a front view, with a portion thereof broken away, showing a fuel injection valve according to an embodiment of the present invention.

The basic structure of a fuel injection valve 10 according to the present embodiment will be described below with reference to FIG. 1.

The fuel injection valve 10 preferably is applied, for example, to a direct fuel injection type of internal combustion engine, in which the fuel injection valve directly injects fuel into a combustion chamber in a cylinder of the internal combustion engine.

More specifically, the fuel injection valve 10 includes a housing 12, a solenoid unit 14 (actuator) disposed on a distal end of the housing 12, a fuel injector 16 disposed on a distal end of the solenoid unit 14, a fuel supply unit 18 connected to a proximal end of the housing 12 and which supplies fuel to the fuel injector 16, a cylinder internal pressure sensor 20 (cylinder internal pressure detecting unit) mounted on a distal end of the fuel injector 16, and a signal transmitting unit 24 that electrically connects the cylinder internal pressure sensor 20 and a terminal 22 provided on the housing 12. Further, in the present embodiment, the fuel supply unit 18 side of the fuel injection valve 10 is referred to as a proximal end side (in the direction of the arrow A), whereas the fuel injector 16 side of the fuel injection valve 10 is referred to as a distal end side (in the direction of the arrow B).

The housing 12 includes a main body portion 26, and a coupler 28 that projects sideways from the proximal end of the main body portion 26. In this case, the fuel supply unit 18 is inserted into the interior of the main body portion 26. The fuel supply unit 18, for example, includes a non-illustrated supply passage in the interior thereof for supplying fuel. The fuel, which is supplied from the exterior through a fuel pipe, is supplied to the fuel injector 16 from the supply passage. A connector of a non-illustrated harness is installed detachably to the coupler 28.

The solenoid unit 14 includes a cylindrical coil housing 30, a bobbin 32 accommodated in the interior of the coil housing 30, and a coil 34, which is wound around the bobbin 32. The proximal end side of the bobbin 32 is formed as a terminal support portion 36, which retains the distal end portions of a pair of power supply terminals 22a, 22c, and a signal terminal 22b. Further, a movable core 38 is accommodated inwardly of the bobbin 32 in the interior of the solenoid unit 14. A needle 40, which extends in the direction of the arrow A and the arrow B and penetrates through the interior of the solenoid unit 14 and the fuel injector 16, is connected to the movable core 38.

The power supply terminals 22a, 22c are connected electrically with the coil 34. Further, the proximal end side of the power supply terminals 22a, 22c and the signal terminal 22b are exposed to the exterior through a recess that is formed in the coupler 28. The coupler 28 and the connector of the harness are fitted together, and current is supplied from the exterior to the power supply terminals 22a, 22c through the harness, the connector, and the coupler 28, whereby the coil 34 is excited to generate a magnetic force. Consequently, upon excitation of the coil 34, the movable core 38 is displaced at the interior of the bobbin 32 in the direction of the arrow A.

The fuel injector 16 includes a valve housing 42, which is connected to a proximal end of the solenoid unit 14. The valve housing 42 is formed from a metal material, for example, and includes a flange 44 that serves to close the distal end of the solenoid unit 14, and a cylindrical portion 46 that extends in a straight line in the direction of the arrow B from the flange 44.

An injection port 50 is formed on a distal end of the cylindrical portion 46, and the injection port 50 is closed by a spherical valve element 52, which is attached to the distal end of the needle 40. As noted previously, upon excitation of the coil 34, when the movable core 38 is displaced in the direction of the arrow A, the needle 40 and the valve element 52 move together integrally in the direction of the arrow A. As a result, the valve element 52 separates away from the injection port 50, whereby the fuel injection valve 10 shifts from a valve closed state into a valve open state, and fuel can be injected at a predetermined pressure from the injection port 50 into the combustion chamber.

The cylindrically shaped cylinder internal pressure sensor 20 is press-inserted and fitted on an outer circumferential side of the distal end of the cylindrical portion 46. The cylinder internal pressure sensor 20 is equipped, for example, with a non-illustrated piezoelectric element in the interior thereof, and a connection terminal 48 is connected to the piezoelectric element. Consequently, using a piezoelectric sensor, the cylinder internal pressure sensor 20 detects the pressure (cylinder internal pressure) of the combustion chamber in the cylinder, and a detection signal responsive to the detected cylinder internal pressure is output as a sensor signal (output signal) through the connection terminal 48.

The signal transmitting unit 24 is disposed on an outer circumferential side of the valve housing 42, and includes a first signal transmitting member 54, which is connected to the connection terminal 48, and a second signal transmitting member 56, which is accommodated in the coil housing 30 and interconnects the first signal transmitting member 54 and the signal terminal 22b.

The first signal transmitting member 54 includes an insulating body 58, which is disposed on an outer circumferential side of the cylindrical portion 46 and is made from a resin material such as a heat resistant resin or the like, and a first conductive layer 60, which is disposed in the interior of the insulating body 58 and is made from a member capable of being energized electrically, such as a plating layer or the like.

A cover member 62 that covers the insulating body 58 is mounted on an outer circumferential side of the insulating body 58.

The second signal transmitting member 56 is made up from a plate-shaped member formed from a resin material, for example, and has a predetermined length along the direction of the arrow A and the direction of the arrow B. In the interior thereof, a second conductive layer 72 is formed from a member capable of being energized electrically, such as a plating layer or the like. A first connector 74 that electrically connects the first conductive layer 60 and the second conductive layer 72 is formed on the distal end of the second conductive layer 72. Further, a second connector 76 that electrically connects the second conductive layer 72 and the signal terminal 22b is formed on the proximal end of the second conductive layer 72.

Accordingly, the cylinder internal pressure sensor 20 is connected electrically to the connector and the harness via the connection terminal 48, the first conductive layer 60, the first connector 74, the second conductive layer 72, the second connector 76, and the signal terminal 22b.

Characteristic Structure of the Present Embodiment

Next, characteristic structures of the fuel injection valve 10 according to the present embodiment will be described below with reference to FIGS. 2A through 3B.

Figure 2A:
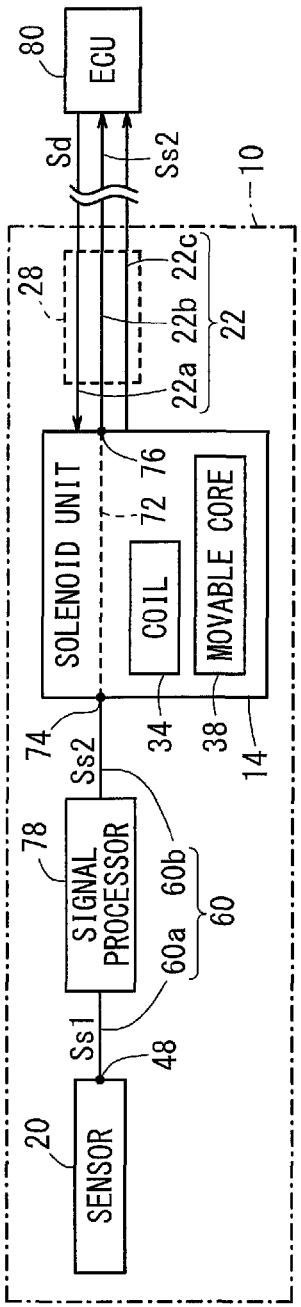
FIGS. 2A through 2C are block diagrams of the fuel injection valve of FIG. 1.

As shown in FIG. 2A, in the fuel injection valve 10 according to the present embodiment, a signal processor 78 (signal processing unit) is disposed between the cylinder internal pressure sensor 20 and the solenoid unit 14.

More specifically, the first conductive layer 60 is constituted from an input side conductor 60a, which is connected electrically via the connection terminal 48 to the cylinder internal pressure sensor 20, and an output side conductor 60b, which is connected electrically to the first connector 74. The signal processor 78 is interposed between the input side conductor 60a and the output side conductor 60b.

The cylinder internal pressure sensor 20 detects the cylinder internal pressure, and in the case that the sensor signal Ss1 (referred to below as a first sensor signal Ss1) is output responsive to the detected cylinder internal pressure, the signal processor 78 implements a predetermined signal processing routine with respect to the first sensor signal Ss1, which is input via the connection terminal 48 and the input side conductor 60a, and the first sensor signal Ss1 is converted into a second sensor signal Ss2 having high resistance to noise. Further, the first sensor signal Ss1 is a weak analog signal having a signal level lower than a drive signal Sd to be described later.

The second sensor signal Ss2 is output to an ECU 80 of the vehicle, in which a direct fuel injection type internal combustion engine is mounted, via the output side conductor 60b, the first connector 74, the second conductive layer 72, the second connector 76 and the signal terminal 22b, the connector, and the harness. Based on the input second sensor signal Ss2, the ECU 80 generates the drive signal Sd (drive signal) for placing the fuel injection valve 10 in a valve open state, and supplies the drive signal Sd to the solenoid unit 14 through the power supply terminals 22a, 22c. Consequently, a current flows through the coil 34 and excites the coil 34, and upon excitation of the coil 34, the movable core 38 is made to move in the direction of the arrow A (see FIG. 1), whereby the valve element 52 separates away from the injection port 50, and the fuel injection valve 10 can be shifted into a valve open state.

As noted above, since the second sensor signal Ss2 is a signal having high resistance to noise, even if the signal passes through the first connector 74, the second conductive layer 72, and the second connector 76, which are disposed in the vicinity of the coil 34 of the solenoid unit 14 or the like, the influence of noise due to the drive signal Sd (e.g., inductive voltage generated in the second conductive layer 72 or the like due to the drive signal Sd), or noise caused by excitation of the coil 34 (e.g., a current generated in the second conductive layer 72 or the like due to excitation of the coil 34) can be suppressed.

Moreover, since it is only necessary to dispose the signal processor 78 between the cylinder internal pressure sensor 20 and the solenoid unit 14, as described above with reference to FIG. 1, this implies that the signal processor 78 may be arranged at any of the following locations: (1) in the vicinity of the connection terminal 48, (2) at any location midway along the first conductive layer 60, and (3) in the vicinity of the first connector 74. If arranged at any of such locations, by converting the first sensor signal Ss1 into the second sensor signal Ss2 having high resistance to noise, the influence of noise caused by the drive signal Sd, or noise due to excitation of the coil 34 can be suppressed. In the foregoing manner, with the present embodiment, since it is possible for the signal processor 78 to be disposed at any arbitrary location between the cylinder internal pressure sensor 20 and the solenoid unit 14, in FIG. 1, illustration of the signal processor 78 has been omitted.

Next, the configuration of the signal processor 78 will be described in detail with reference to FIGS. 2B through 3B (first through third exemplary embodiments).

Figure 2B:
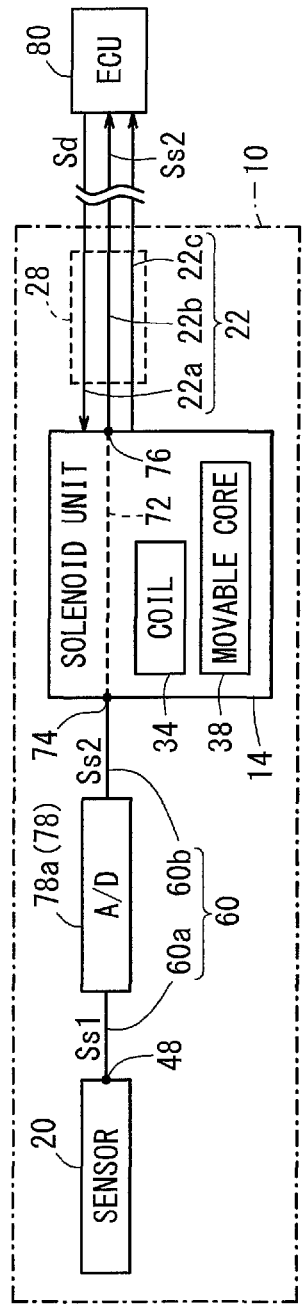

In the first exemplary embodiment of FIG. 2B, a case is shown in which the signal processor 78 is constituted by an A/D converter 78a, and the A/D converter 78a converts the first sensor signal Ss1, which is an analog signal, into the second sensor signal Ss2, which is a digital signal. By converting the first sensor signal Ss1, which is an analog signal, into a digital signal (second sensor signal Ss2) having high resistance to noise, the influence of the above-described noises can be reduced.

Figure 2C:
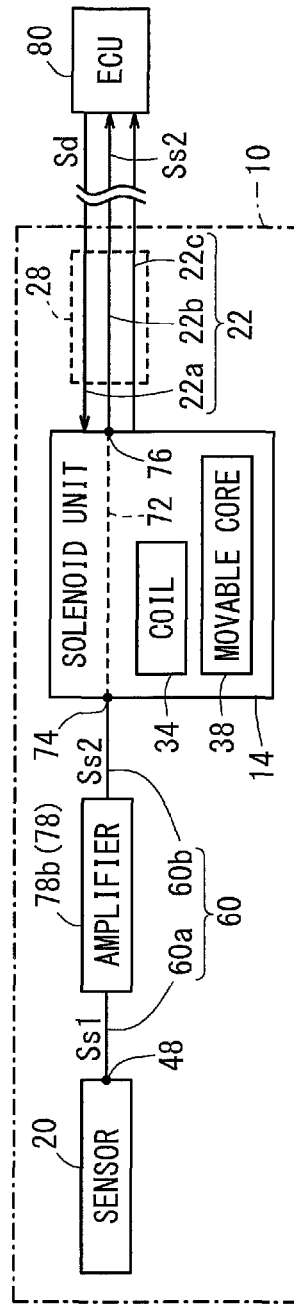

In the second exemplary embodiment of FIG. 2C, a case is shown in which the signal processor 78 is constituted by an amplifier 78b, and the amplifier 78b amplifies the first sensor signal Ss1, which is an analog signal, to thereby be converted into the second sensor signal Ss2, which possesses a high signal level. If the signal level of the second sensor signal Ss2 is made relatively higher than the noise level, since the first sensor signal Ss1 is converted into a signal having high resistance to noise, the influence of the above-described noises can be reduced.

In the third exemplary embodiment of FIGS. 3A and 3B, cases are shown in which the signal processor 78 is constituted by a series-connected circuit made up from the A/D converter 78a and the amplifier 78b.

FIG. 3A illustrates a case in which the amplifier 78b and the A/D converter 78a are connected in this order electrically with respect to the cylinder internal pressure sensor 20. In this case, the amplifier 78b amplifies the first sensor signal Ss1, which is an analog signal, and the A/D converter 78a converts the amplified first sensor signal Ss1 into the second sensor signal Ss2, which is a digital signal, and outputs the digital second sensor signal Ss2. Consequently, the noise tolerance of the second sensor signal Ss2 can be further enhanced, and the influence of noise can be further reduced. Further, since the second sensor signal Ss2, which is a digital signal, is output to the ECU 80, noise removal processing thereon can easily be carried out by the ECU 80.

FIG. 3B illustrates a case in which the A/D converter 78a and the amplifier 78b are connected in this order electrically with respect to the cylinder internal pressure sensor 20. In this case, the A/D converter 78a converts the analog first sensor signal Ss1 into a digital signal, the amplifier 78b amplifies the first sensor signal Ss1 after A/D conversion thereof, and the A/D converted and amplified signal is output as the second sensor signal Ss2, which is a digital signal. In this manner, after A/D conversion has been carried out by way of the A/D converter 78a, amplification is performed with the amplifier 78b. Thus, in this case as well, resistance to noise of the second sensor signal Ss2 can be further heightened and improved, and the influence of noise can further be reduced. Further, since the second sensor signal Ss2, which is a digital signal, is output to the ECU 80, noise removal processing by the ECU 80 can easily be carried out.

Effects of the Present Embodiment

FIGS. 4A and 4B are block diagrams of fuel injection valves 82 according to comparative examples. FIG. 4A illustrates a case in which the signal processor 78 of the present embodiment is not provided, and FIG. 4B illustrates a case in which an amplifier 84 is interposed between the second connector 76 and the signal terminal 22b. Moreover, in FIGS. 4A and 4B, for simplifying description thereof, constituent elements, which are the same as those of the fuel injection valve 10 according to the present embodiment (see FIGS. 1 through 3B), are denoted by the same reference characters.

In the case of FIG. 4A, since the signal processor 78 is not provided, the first sensor signal Ss1, which is output from the cylinder internal pressure sensor 20, is output to the ECU 80 via the connection terminal 48, the first conductive layer 60, the first connector 74, the second conductive layer 72, the second connector 76, the signal terminal 22b, the connector, and the harness.

However, the first sensor signal Ss1 is a weak signal having a signal level lower than that of the drive signal Sd. Consequently, when current flows in the coil 34 under the supply of the drive signal Sd to excite the coil 34 whereby the movable core 38 is moved, if the first sensor signal Ss1 passes through the first connector 74, the second conductive layer 72, and the second connector 76, there is a possibility that noise due to the drive signal Sd, or noise caused by excitation of the coil 34 will become superimposed on the first sensor signal Ss1. As a result, in the ECU 80, there is a concern that the drive signal Sd will be generated based on the first sensor signal Ss1 with noise superimposed thereon.

Further, in the case of FIG. 4B, the amplifier 84, which is interposed between the second connector 76 and the signal terminal 22b, amplifies the first sensor signal Ss1, on which the aforementioned noise is superimposed in the first connector 74, the second conductive layer 72, and the second connector 76. In this case, if the signal level of the first sensor signal Ss1 prior to amplification is significantly lower in level than the noise level, the amplifier 84 substantially acts as a noise amplifier. As a result, in the ECU 80, there is a concern that the drive signal Sd will be generated based on the input signal after amplification thereof (effectively, an amplified noise signal).

Accordingly, in either of the comparative examples shown in FIGS. 4A and 4B, in the event that noise is superimposed on the first sensor signal Ss1, the ECU 80 is incapable of controlling the fuel injection valve 82 accurately and with suitable precision.

Thus, with the ECU 80, there is a need to remove noise using a filter, or alternatively, to remove such noise by way of signal processing. However, in the case that a filter is added, the number of parts increases on the side of the ECU 80. On the other hand, if the noise is removed by way of signal processing, the ECU 80 must be constituted as a complex and high-performance signal processing apparatus. Accordingly, in the event that either of such noise removal countermeasures is adopted, costs are increased.

In contrast thereto, as shown in FIG. 2A, in the fuel injection valve 10 according to the present embodiment, the signal processor 78 is disposed between the cylinder internal pressure sensor 20 and the solenoid unit 14, and before the sensor signal (first sensor signal Ss1) from the cylinder internal pressure sensor 20 passes through the first connector 74, the second conductive layer 72, and the second connector 76, which are disposed in the vicinity of the coil 34 of the solenoid unit 14 or the like, signal processing is carried out on the first sensor signal Ss1.

Accordingly, the first sensor signal Ss1, which is output from the cylinder internal pressure sensor 20, is converted into the second sensor signal Ss2 having high resistance to noise. As a result, at a low cost, the influence of noise with respect to the sensor signal can be suppressed. Consequently, the ECU 80 acquires the second sensor signal Ss2 in which the influence of noise thereon is small, and generates the drive signal Sd based on the acquired second sensor signal Ss2. Further, by supplying the generated drive signal Sd to the fuel injection valve 10, the fuel injection valve 10 can be controlled accurately and with high precision. In this manner, with the present embodiment, by providing the signal processor 78, the sensor signal can be detected with high accuracy.

Further, as shown in FIGS. 2B and 2C, the signal processor 78 is equipped with the A/D converter 78a that converts the analog first sensor signal Ss1 into a digital signal, or the amplifier 78b that amplifies the first sensor signal Ss1.

Thus, if the first sensor signal Ss1 is converted into the digital second sensor signal Ss2 by the A/D converter 78a, the first sensor signal Ss1 is converted into a signal having high resistance to noise. As a result, the influence of such noise can be made smaller. Further, the noise removal process on the side of the ECU 80 can be carried out easily.

On the other hand, as a result of amplifying the first sensor signal Ss1 by the amplifier 78b, if the signal level of the second sensor signal Ss2 after amplification is made higher than the noise level, then the first sensor signal Ss1 is converted into a signal having high resistance to noise. Thus, the influence of such noise can also be made smaller.

Further, as shown in FIG. 3A, in the signal processor 78, the amplifier 78b and the A/D converter 78a may be connected in this order electrically to the cylinder internal pressure sensor 20, or alternatively, as shown in FIG. 3B, the A/D converter 78a and the amplifier 78b may be connected in this order electrically to the cylinder internal pressure sensor 20. In this manner, by connecting the A/D converter 78a and the amplifier 78b electrically in series, resistance to noise of the second sensor signal Ss2 can be further heightened and improved, and the influence of such noise can further be minimized.

The present invention is not limited to the aforementioned embodiment, and it is a matter of course that various additional or alternative structures may be adopted therein without deviating from the scope of the invention as set forth in the appended claims.

What is claimed is:

1. A fuel injection valve for injecting fuel directly into a combustion chamber of a cylinder of an internal combustion engine, by placing the fuel injection valve in a valve open state due to driving of an actuator, comprising:

a cylinder internal pressure sensor mounted to the fuel injection valve to be integral with the fuel injection valve, the cylinder internal pressure sensor detecting a cylinder internal pressure in the cylinder, and outputting an output signal responsive to the detected cylinder internal pressure; and a signal processor that performs predetermined signal processing with respect to the output signal, the signal processor disposed between the cylinder internal pressure sensor and the actuator, which is disposed on a proximal end side of the fuel injection valve inside the fuel injection valve.

2. The fuel injection valve according to claim 1, wherein the signal processor comprises an A/D converter that converts the output signal into a digital signal.

3. The fuel injection valve according to claim 1, wherein the signal processor comprises an amplifier that amplifies the output signal.

4. The fuel injection valve according to claim 1, wherein the signal processor comprises an A/D converter that converts the output signal into a digital signal, and an amplifier that amplifies the output signal, wherein the amplifier and the A/D converter are connected in this order electrically to the cylinder internal pressure sensor, or alternatively, the A/D converter and the amplifier are connected in this order electrically to the cylinder internal pressure sensor.

* * * * *